(12) United States Patent
Lee (10) Patent No.: US 9,542,339 B1
(45) Date of Patent: Jan. 10, 2017

(54) MOBILE DEVICE SLED WITH NOVEL PORT USAGE AND STANDING CONFIGURATION FOR READY PAIRING BETWEEN A MOBILE DEVICE AND ASSOCIATED PERIPHERAL DEVICES

(71) Applicant: Koamtac, Inc., Princeton, NJ (US)

(72) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 0 days.

(21) Appl. No.: 14/828,250

(22) Filed: Aug. 17, 2015

Related U.S. Application Data (60) Provisional application No. 62/102,022, filed on Jan. 10, 2015.

(51) Int. Cl.
  *G06K 7/00* (2006.01)
  *G06F 13/10* (2006.01)
  *G06F 13/38* (2006.01)

(52) U.S. Cl.
  CPC .......... *G06F 13/105* (2013.01); *G06F 13/387* (2013.01)

(58) Field of Classification Search
  CPC .... G06Q 20/12; G06Q 20/32; G06Q 20/3226; G06Q 20/3674; G06Q 20/385; G06Q 20/409; G06Q 2220/00; G06Q 20/10; G06Q 20/202; G06Q 20/3227; G06Q 20/367; G06Q 20/3825; G06Q 40/00; G06F 1/1626
  USPC ................................ 235/375, 492, 380, 440
  See application file for complete search history.

(56) References Cited

U.S. PATENT DOCUMENTS

| | | | |
|---|---|---|---|
| 2011/0270741 A1* | 11/2011 | Kayser ................... | G06Q 40/00 705/39 |
| 2014/0249948 A1* | 9/2014 | Graylin .................. | G06Q 20/12 705/21 |
| 2014/0347000 A1* | 11/2014 | Hamann ................. | G06F 1/189 320/103 |
| 2015/0363771 A1* | 12/2015 | Graylin .............. | G06Q 20/3825 705/65 |

\* cited by examiner

*Primary Examiner* — Thien M Le
(74) *Attorney, Agent, or Firm* — Robert Gorman; Gorman Law Offices (57) ABSTRACT

The present invention relates to an apparatus and method for operative physical cooperation and ready detachment thereof between a mobile phone, tablet or the like, and an associated peripheral device such as barcode scanners and payment terminals, and improved methods for both physically combining the above and for electronically connecting the same, and for providing ports and mechanical structures which improve user ergodynamics through the use of foldable standing configurations and other aspects.

13 Claims, 10 Drawing Sheets

MOBILE DEVICE SLED WITH NOVEL PORT USAGE AND STANDING CONFIGURATION FOR READY PAIRING BETWEEN A MOBILE DEVICE AND ASSOCIATED PERIPHERAL DEVICES

CROSS-REFERENCE TO RELATED APPLICATIONS

This application claims priority from U.S. Provisional Pat. Applic. No. 62/102,022, titled "Mobile Device Sled With Novel Port Usage and Standing Configuration for Ready Pairing Between a Mobile Device and Associated Peripheral Devices as filed on Jan. 10, 2015, the entirety of which is hereby incorporated by reference.

1. FIELD OF THE INVENTION

The present invention relates to an apparatus and method for operative physical cooperation between a mobile phone, tablet or the like, and an associated peripheral device such as barcode scanners and payment terminals, and improved methods for both physically combining the above and for electronically connecting the same, and for providing ports and mechanical structures which improve user ergodynamics.

2. DISCUSSION OF THE RELATED ART

Mobile devices or terminals such as smart phones, tablets and the like are becoming widely used as more than mere communication or media devices. There are a variety of field applications for such mobile devices that may be advantageously effectuated through the use of peripherals that can be connected thereto.

Despite such advantages, when a given mobile device is connected to certain peripheral devices, effective operation between the same is often limited by the fact that it is difficult to use the devices at the same time, especially given the need to maintain proximate electronic connectivity ranges and also because of the physical limitations inherent in trying to manually hold or manipulate all of the above at the same time during the course of operation by an end user.

Because of the above challenges, current approaches for using any of the above devices have been hitherto limited to employment of awkward physical and electronic connections required for the simultaneous use and connection of the peripheral devices that a user may wish to associate therewith. Additionally, certain special purpose peripheral devices such as handheld barcode scanning devices and/or payment terminals currently are particularly difficult to use with tablets and mobile phones, thereby limiting their effective field deployment in industries such as retail, logistics, medical institutions, warehousing, transportation, entertainment and sporting venues. Additionally, such devices often do not have effective ports for connections, nor do the user ergodynamics provide for ease of use, particularly across a variety of field environments, including but not limited to retail, office, warehouse, transportation and medical environments, and the like.

SUMMARY OF THE INVENTION

The present invention is, in one embodiment, directed to a mobile device and peripheral device consolidation system and method for providing improved interoperability between a mobile device and a peripheral device. More particularly, the present invention is directed to a system and method for providing both a physical and electronic approach to enabling a mobile device such as a mobile phone or tablet, to be readily and conveniently paired with a peripheral devices such as bar code readers and payment terminals in a way that substantially obviates one or more problems due to limitations and disadvantages of the related art.

Additionally, the proposed invention pertains to a novel approach to physically attaching any of the aforementioned to each other in a convenient, modular fashion that can be used in a standing configuration. In doing so, the present inventive approach utilizes a plastic or metal structure or housing that can readily attach to the back of a mobile device, yet can also house or readily accept a peripheral device as an attachment thereto, yet during usage extends out as stabilizer leg in order to provide a standing configuration for ease of use. Perhaps more importantly, though, in one optional instantiation, devices. The inventive approach is therefore especially valuable in that permits usage of mobile phone (e.g., smart phones) and tablets or the like with a handheld barcode scanning device, a payment terminal (MSR, chip reader, etc.), or other peripheral apparatus in a wireless, physically compact and consolidated fashion that requires little or no set up and integration or configuration, and furthermore, offer the ability to effectuate operation of such peripheral devices through either their native operation button situated thereon or, for ease of access when mounted on the inventive sled, through an external sled operation button. This special feature, it might be noted, is afforded through native USB connections by novel provision of a special purpose programmed circuit in the sled that contains a smart multiplexer logic core that can accept a configuration from either external software or scanning operation, processed from a peripheral device CPU, and as accessed via the aforementioned native USB connections.

Accordingly, the present invention offers for the following beneficial advances relating to providing a mobile device and peripheral device consolidation system for providing improved interoperability between a mobile electronic device and a peripheral device through: (1) provision of a "sled" that includes a novel attachment and detachment structure that permits standalone peripheral devices such as barcode scanners and payment terminals to be physically consolidated with all types of mobile electronic devices, including smart phones and larger size devices such as tablets in a convenient, stream lined, user-friendly way; (2) provision of a sled with modular physical capacity for ready attachment and detachment of the aforementioned bar code readers (scanners) and/or a payment terminals as desired; (3) a sled with an upright standing configuration option; (4) a sled that provides users with the option to seamlessly use either the native operation (e.g., scan) button existing on a barcode reader, or an external operation or scan button on the sled that readily controls the aforementioned bar code reader, and furthermore, does so without conflict between the existing circuitry relating to the native button; (5) a sled that provides for the innovative use of USB connections for leveraging the same in order to provide display-free configuration of the aforementioned scan button options; (6) provision of an improved swing-out USB connection; (7) provision of a modular payment terminal rotating connection which provides for automatic rotation of the display of a payment terminal through at least 180 degrees of rotation in order to maximize the usability when attached to the sled, as well as when detached from the sled; (8) enabling a user, through the inventive modular architecture, to change smart phones/cell phones (as well as peripherals such as the compact bar code reader and/or payment terminal) periodically, without replacing the inventive sled.

Technical subject matters to be realized by embodiments of the present invention are not limited to the following technical subject matters, and other technical subject matters not mentioned in the following description may be easily appreciated by those skilled in the art to which the present invention pertains, without difficulty. Accordingly, additional advantages, objects, and features of the invention will be set forth in part in the description which follows and in part will become apparent to those having ordinary skill in the art upon examination of the following may be learned from practice of the invention. The objectives and other advantages of the invention may be realized and attained by the structure particularly pointed out in the written description and claims hereof as well as the appended drawings. It is therefore to be understood that both the foregoing general description and the following detailed description of the present invention are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

To achieve the objects and other advantages and, in accordance with the purpose of the invention as embodied and broadly described herein, the proposed invention relates at its broadest level, to a method and apparatus whereby improved interoperability between the peripheral device and a mobile terminal is provided according to the following which comprises: (a) a modular sled having: an attachment means for physically attaching a structure of said sled to said mobile device; at least one USB port; an External Button selection MUX logic core; at least one external button electronically connected to said External Button selection MUX logic core; wherein said External Button selection MUX logic core includes logic circuitry for configuring said at least one USB port as either: a standard USB port; or as a proprietary external scan button logic pathway; and (b) at least one attachment means for physically attaching said at least one peripheral device to said structure of said sled. Additionally, provision is made for the modular sled to includes at least one of the following peripheral devices chosen from the group consisting of: compact bar code readers, Magnetic Strip Readers (MSRs), Integrated Circuit (IC) card readers, peripheral device triggers, Radio Frequency Identification (RFID) tag readers, biometric verification modules, or multi-threat monitors; and payment terminals. The modular sled also includes logic for receiving External Button selection instructions through a port connecting said modular sled and said at least one peripheral device from at least one CPU of said at least one peripheral device. The attachment means for physically attaching said at least one peripheral device to said structure of said sled comprises a readily attachable and detachable structure chosen from the group comprising at least one of the following of: a pocket; a slot, a locking mechanism, a male/female type USB arrangement, or a sliding engagement arrangement. The mobile device and peripheral device consolidation may also include at least one foldable standing configuration member, and may further includes at least one of the following of: an improved swing out USB male connector or a fixed position USB memory stick connector. Where the peripheral device is a payment terminal, it includes a payment terminal screen having a 180° rotation that is automatically triggered by sensing attachment/detachment. The payment terminal is configurable through at least one of the following of: a USB connector when attached to said sled; a native configuration when not attached to said sled; or via a power connection.

In another broad embodiment, the present mobile device and peripheral device consolidation system for providing improved interoperability between a mobile device and at least one peripheral may further include a sled which provides for executing, a processor (CPU) that is connected to a special logic core multiplexer, and accordingly, both are configured to execute at least the following instructions: (a) configuring a special purpose CPU with custom logic for assessing button configuration selections; (b) configuring a special purpose multiplexer with custom logic for executing pre-defined special purpose button configuration selections; (c) loading said special purpose CPU with instructions for executing the aforementioned button configuration selections, said instructions transforming data, represented as rudimentary signals into practical industrial applications as described herein; (d) transmitting said instructions for executing button configuration selections to the special purpose multiplexer; (e) carrying out said instructions for executing button configuration selections at said special purpose multiplexer; and (f) utilizing said instructions for executing button configuration selections to utilize a USB port as a communications port when said instructions indicate an External Button selection or as a regular USB port when said instructions indicate a Native Button selection.

The aforementioned may be accomplished in accordance with the particulars described herein, as well optionally through additional particulars that maybe found in pending U.S. Pat. No. 8,832,323, titled "Connectivity Sled for Electronic Pairing and Physical Cooperation Between a Mobile Device and Associated Peripheral Devices", Issued Sep. 9, 2014, and pending U.S. patent application Ser. No. 14/219, 920, titled "Mobile Device With Improved Charging Capability and Casement Structure", filed Mar. 19, 2014, and pending U.S. patent application Ser. No. 14/153,006, titled "modular Payment Terminal Sled with Automatic Identification Capability", all of which are hereby incorporated by reference in their entirety.

Reference will now be made in detail to the illustrative embodiments of the present invention, examples of which are illustrated in the accompanying drawings. Wherever possible, the same reference numbers will be used throughout the drawings to refer to the same or like parts. Constituent components and operations of the present invention shown in the drawings will be disclosed only for illustrative purposes of the present invention, such that technical spirit, important constructions and operations of the present invention are not limited to only the following embodiments, and can also be applied to other embodiments.

Figure 1A:
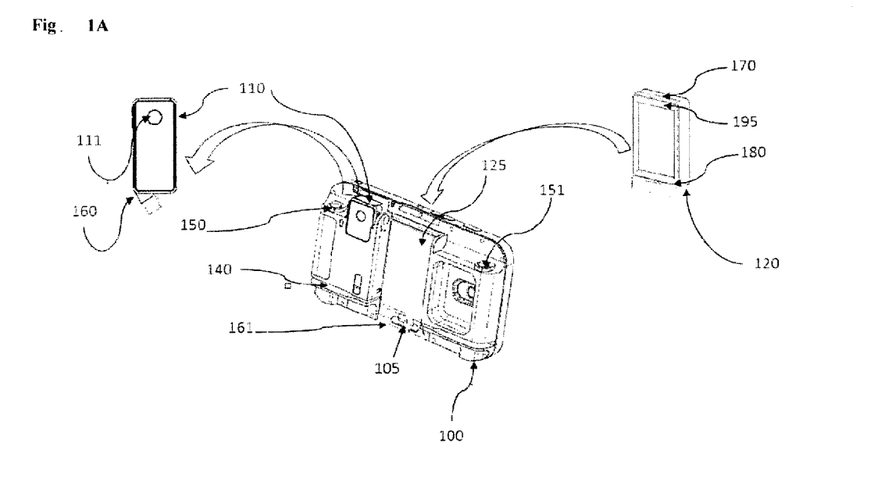
FIGS. 1A-1E depict an illustrative cooperative physical engagement of a mobile device and two illustrative peripheral devices, such as a compact bar code reader and payment terminal with an illustrative standing configuration, that would effectuate the novel operations performed therebetween according to one embodiment of the present invention, with FIG. 1A showing an exploded view of the aforementioned components prior to combination thereof, and FIG. 1B depicting the combination thereof, while FIG. 1C details the separation of the aforementioned barcode reader from the combination, and FIG. 1D showing an alternate configuration of the same, and FIG. 1E showing the aforementioned barcode reader secured therein.
Figure 1B:
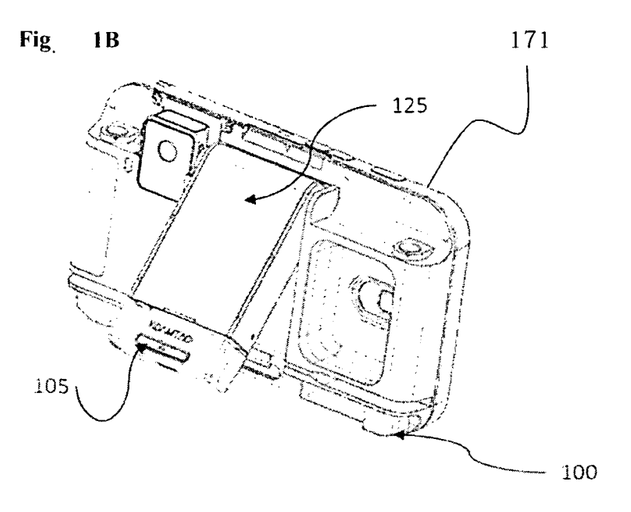
Figure 1C:
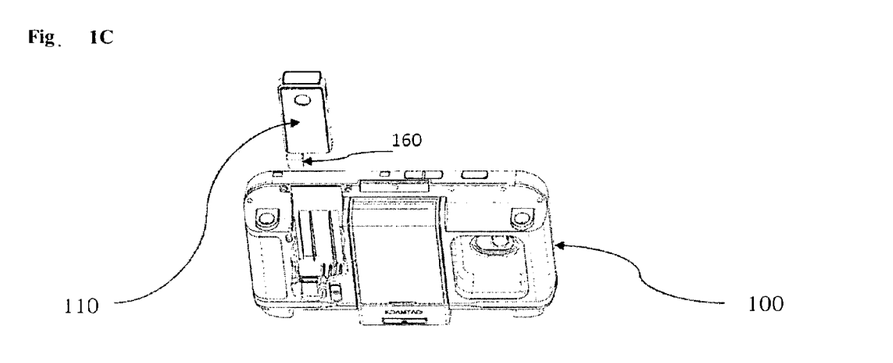
Figure 1D:
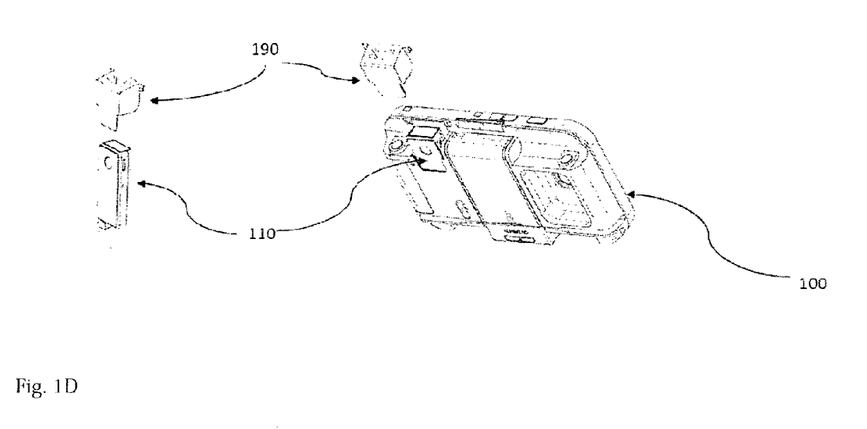
Figure 1E:
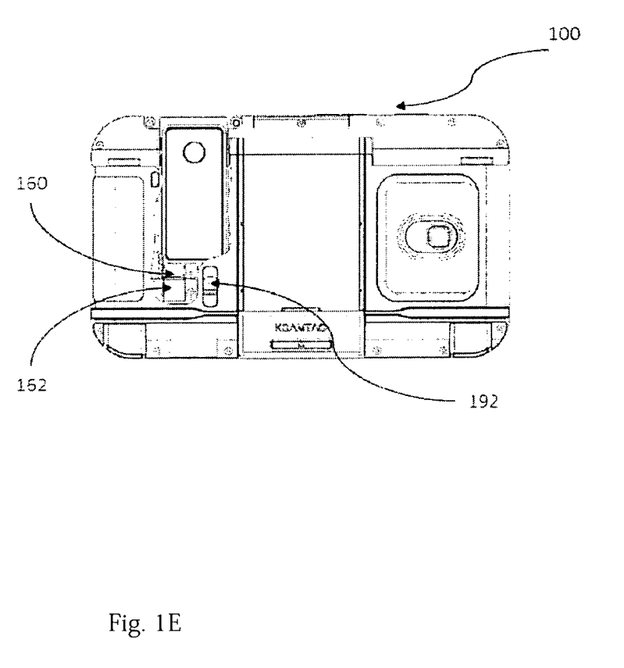

FIGS. 1A-1E illustrate an example of one illustrative embodiment of the inventive mobile device and peripheral device consolidation system 1 with one embodiment of a standing configuration for providing improved interoperability between a mobile device and a peripheral device. FIG. 1A, for example, details an illustrative configuration showing the novel modularity of mobile device and peripheral device consolidation system 1, wherein a peripheral device such as barcode scanner 110 may be wholly detachable from modular sled 100, and peripheral devices such as payment terminal 120, attachable via a sliding guide 140 and also potentially releasable by pressing of a release button 105 or the like so as to activate a spring loaded latch, may perform a dual function as a standing leg (foldable standing configuration member) for propping up mobile the entirety of device and peripheral device consolidation system 1 in such a way so as to offer novel, improved user ergodynamics as a standing configuration 130, as also seen in FIG. 1B, if not completely detached therefrom. The additional novelty of improved ports provisioning is illustratively seen in FIG. 1C, wherein a hardwired (as opposed to optional wireless) connectivity is shown, that of USB male connector 160 and female USB connector slot 162 for connecting a peripheral such as barcode scanner 110 to modular sled 100. Optionally, a protective cap 190, as illustratively shown in FIG. 1D may provide ruggedized structure for delicate peripherals such as barcode scanner 110, a simple but important feature for certain rough environments, but one which is not found in known devices. FIG. 1E further shows an optional locking mechanism 192 for securing peripheral devices, also a simple but heretofore novel feature for mobility purposes and usage of mobile device and peripheral device consolidation system 1 in rugged environments. As depicted collectively therein, an inherent part of modular sled 100 portion of the present invention comprises (at least one) peripheral device (illustratively indicated as barcode scanner 110 and/or payment terminal 120) physically consolidated or connected with mobile device 171 via an attachment means (at least part of modular sled 100, also termed sled 100) having a port 161, the attachment means for attaching the at least one peripheral device to mobile device 171, as well as provides for electronic connection between the respective devices, as described hereafter. The peripheral devices that may be attached to modular sled 100 may be of any type of at least one of the following peripheral devices comprising: compact bar code readers, MSRs, charging bases, IC card readers, peripheral device triggers, RFID tag readers, biometric verification modules, and/or multi-threat monitors, but for purposes of illustration in this particular example, a compact bar code reader 110 is shown in FIGS. 1A-1E. Those skilled in the art will appreciate that various modifications, additions and substitutions are possible from this description, but in general, mobile device 171 is of the type chosen from the groups comprising mobile phones, smart phones, tablets, PDAs, and the like. In any case, mobile device 171 may be connected in a wired fashion (having physical wired contacts or connections, not depicted), or alternatively, in a wireless fashion to the peripheral device connected to the inventive sled through a protocol such as the illustrative Bluetooth® protocol.

With further, more detailed reference to FIG. 1, note that sled 100 (also termed herein modular sled 100), is indicated as an illustrative variant of the present invention which supports attachment of both detachable barcode scanner and detachable payment terminal to tablets. Although this is equally applicable to smaller frames, such as found in smart phones, the tablet is illustrated herein because tablets are normally larger than say 8 inches, and are difficult to use with attachments, so the novel approach to attaching the barcode scanner and payment terminal herein is described as such so as to show its novel structural versatility across various devices. Sled 100 supports barcode scanner 110, as well as payment terminal 120, wherein Payment terminal 120 has an LCD screen with a secure touch sensor as required according to PCI (Payment Card Industry) security standards, and IC Card 170, MSR 180 and Near Field Communication (NFC) 195. Payment terminal 120 would be inserted into payment terminal slot 125 (or other member) and can be unfolded to support standing configuration 130. Payment terminal 125 can be folded to be used as mobile configuration. As illustrated, the folding and unfolding of payment terminal 125 member is one illustrative example of the novel standing configuration for use when an upright device orientation is desired, and for better access of peripheral device functionality in the field. As can be appreciated, the novel standing configuration can utilize other parts (members) of the sled structure instead of, or in addition to, the illustrative payment terminal 125. Also, the novel standing configuration is part of the innovative ergodynamics described herein, and can be aided with use of a hinge and/or spring and/or locking mechanisms for (foldable) opening and closing. Credit cards having magnetic strips would be read by MSR 180 upon passing through MSR Sliding Guide 140. Barcode scanner 110 would be activated by pressing scan buttons 150 and 151 on each side. In other embodiments, barcode scanner 110 and/or payment terminal 120 can be attached to sled 100 using following optional methods: (i) where sled 100 is configured with a pocket, sliding engagement arrangement, or slot for retention of Barcode scanner 110 and/or payment terminal 120; (ii) sled 100 has a USB Type "A" female connector, and securely holds Barcode scanner 110 and/or payment terminal 120 through engagement with built-in USB Type "A" male connector; (iii) sled 100 has a locking mechanism, such as a hood or magnetic to hold Barcode scanner 110 and/or payment terminal 120 securely. Alternatively, sled 100 may be provided with a locking mechanism with a release button 105, supported by an internal spring. in such a configuration, payment terminal 120 would therefore be locked automatically upon inserting into sled pocket 125 for payment terminal 120, and whereby payment terminal 120 would be released upon pressing push button 105, although this aspect may be dispensed with in some embodiments, or replaced with other attach/detach approaches as required. Additionally, barcode scanner 110 may be optionally enclosed by a water protection cap or protective cap 190 in order to provide water and/or dust proof configuration.

Broadly speaking, the inventive modular approach therefore may use three component parts as an independent system and/or as a compact barcode reader by itself with or without an MSR. This modularity can facilitate ongoing use of the system with little to no modifications or configurations in the case of where a user desires to switch or replace a given mobile device. Moreover, the actual design of the modular sled is such that it can be used on all types of mobile devices, without blocking the mobile device communications and/or charging ports, and also supports all manner of native services, even those from specialized smart devices, such as iTunes®-type devices made by from Apple, Inc. of Cupertino, Calif. To this end, the present invention overcomes the aforementioned and other disadvantages inherent in the prior art. In doing so, all of the above permits for electronic communication between all devices in a variety of ways, including according to wireless communication means, such as a connection via a Bluetooth®-protocol based connection available from the Bluetooth SIG Inc., of Kirkland, Wash.

Figure 2:
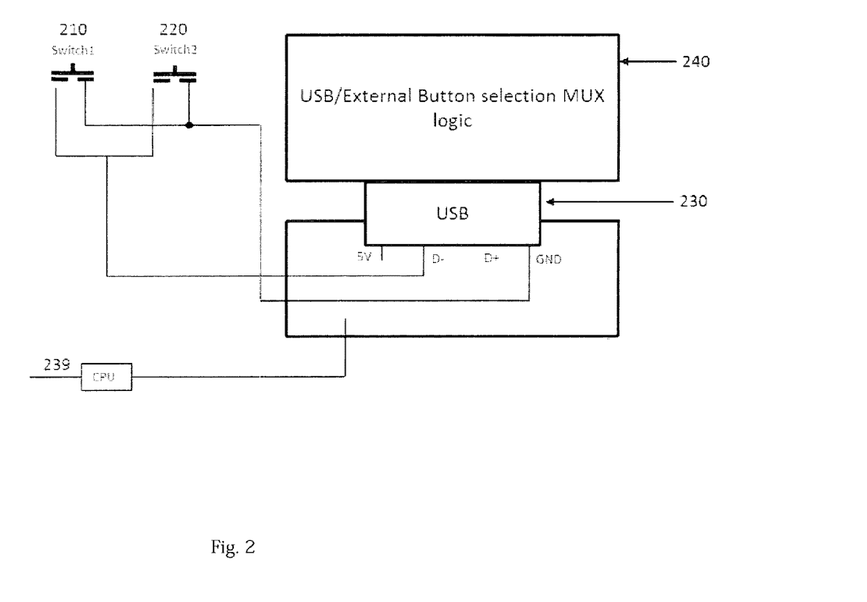
FIG. 2 depicts an illustrative scan button selection of barcode scanner according to one embodiment of the present invention.

FIG. 2 shows an illustrative electronic schematic of the scan button selection of barcode scanner 110 in one embodiment. As depicted therein, USB 230 has Ground, 5V, and two communication signals—D− and D+. Normally, USB 230 cannot support a scan button on barcode scanner 110 and external scan buttons 150, 151 on sled 100. However, the innovative approach as described herein overcomes this limitation to provide unexpected functionality. Scan buttons 150, 151 have switches 210, 220 inside and are connected to USB D-signal 370. Button selection multiplexer (MUX) logic 240 decides the configuration of USB 230 as the standard USB port, or as proprietary logic external scan buttons 210 and 220 according to internal logic therein.

Figure 3:
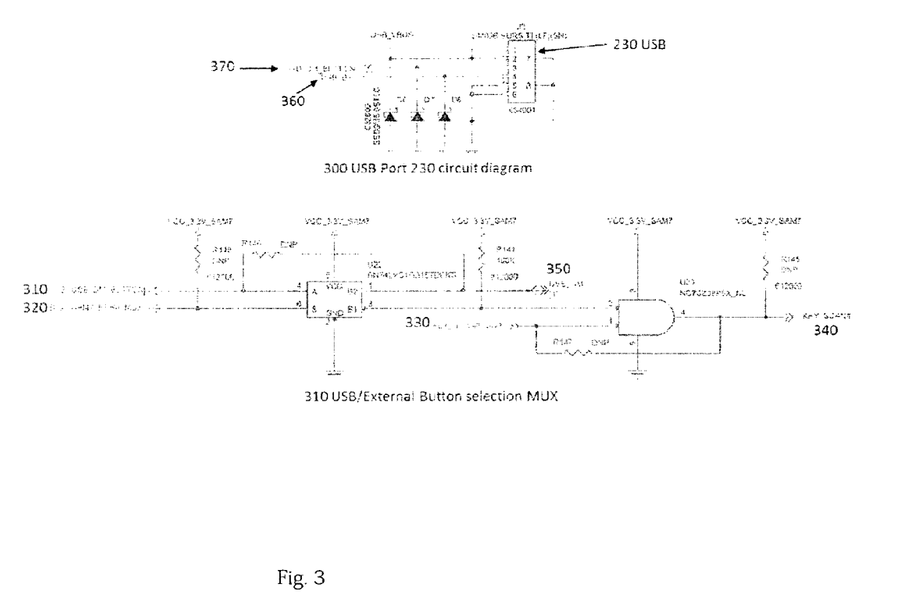
FIG. 3 depicts an illustrative electrical diagram of the USB and External Button Selection multiplexer (MUX) or logic core, according to one embodiment of the present invention.
Figure 5:
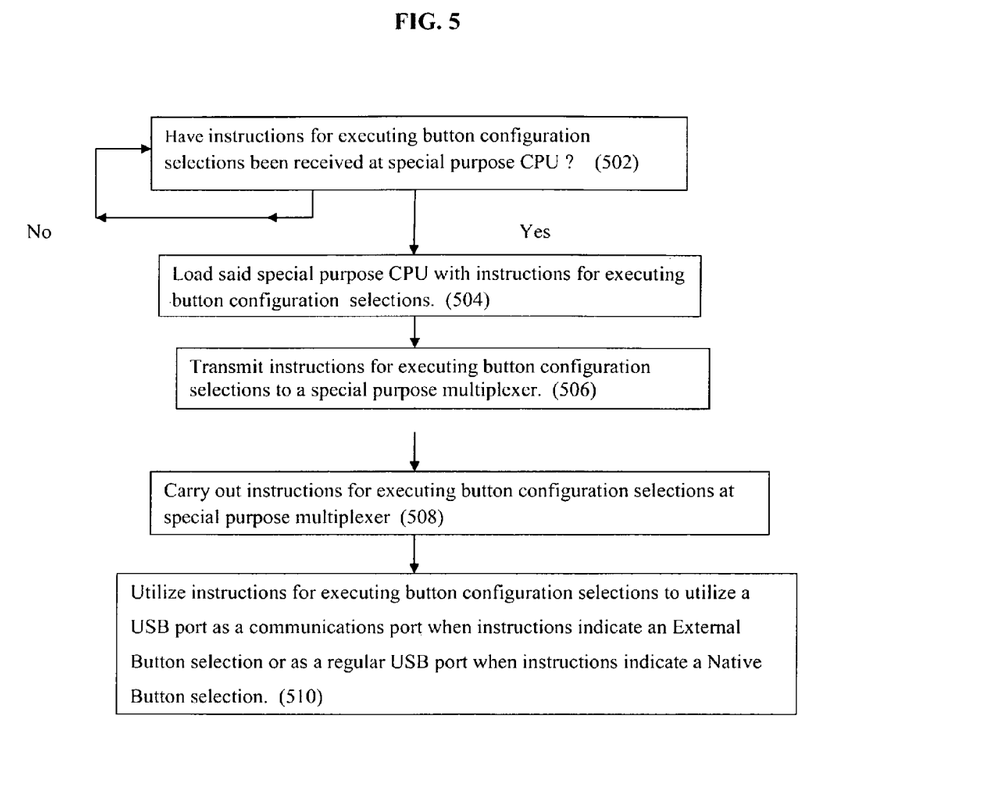
FIG. 5 depicts an illustrative flow diagram for executing button configuration selections according to one embodiment of the present invention.

FIG. 3 depicts an illustrative electronic schematic of the USB and external button selection MUX in one embodiment. This illustrative embodiment shows one example of a detailed circuit diagram of USB and external button selection MUX logic. External switches 210 and 220 are connected to USB_DM_BUTTON signal 310. SAM7_PPR#_MUX selection signal 320 is generated by barcode scanner 110 CPU. SAM7_PPR#_MUX selection signal 320 can be programmed by scanning special barcode using barcode scanner 110, programmed by a sequence of barcode scanner 110 native buttons or by using an external software program that controls barcode scanner 110. USB_DM_BUTTON signal 310 would be treated as a regular USB_DM signal 350 if the USB configuration is selected. Conversely, USB_DM_BUTTON signal 310 would be treated as KEY_SCAN# signal 340 *l* if the external button configuration is selected by the user. KEY_SCAN# signal 340 in barcode scanner 110 would be generated by pressing either switches 210 or 220, if SAM7_PPR#_MUX selection signal 320 is configured as external button configuration. This process is also described in a high-level flow diagram fashion, from beginning to end, in FIG. 5, specifically detailing at least some of the following illustrative steps of: (i) ascertaining whether instructions for executing button configuration selections been received at special purpose CPU, at step 502; (ii) load the special purpose CPU with instructions for executing button configuration selections, at step 504; (iii) transmitting instructions for executing button configuration selections to a special purpose multiplexer, at step 506; (iv) carrying out instructions for executing button configuration selections at special purpose multiplexer, at step 508; and (v) Utilize instructions for executing button configuration selections to utilize a USB port as a communications port when instructions indicate an External Button selection or as a regular USB port when instructions indicate a Native Button selection, at step 510.

Further to the preceding paragraph, mobile device 171 may be of the type chosen from the groups comprising mobile phones, smart phones, tablets, PDAs, etc. and will generally include a display for implementing interactivity with a user, while illustratively, the compact bar code scanner 110 described herein may be any one of various types, such as that found in the illustrative KDC® 550 type unit, available from KoamTac® Inc., of Princeton, N.J. It is worth noting, that, when choosing a compact bar code scanner as peripheral device 10, one generally would need to employ a bar code scanner 110 with programming capability activated through a specific "button selector" barcode (as further discussed below), or the ability to function with KTSync® type software downloaded therein, in order to provide the configuration options that enable a user to choose between employment of a native operation (scan) button, or the external sled operations (scan) button. Accordingly, a user may choose between employment of a native operation (scan) button, or the external sled operations (scan) button by, in one embodiment, employing the bar code scanning unit with programming capability activated through a specific "button selector" barcode as mentioned above. In such an embodiment, two illustrative bar codes may be employed, one customized "external button" bar code to be read for effectuating usage of the external sled button (while contemporaneously altering the functionality of the natural USB ports to accept the signals depicted in FIG. 2), and another customized "native button" bar code to be read for continued usage of the external sled button and maintenance of regular USB port functionality. In this operative approach, known herein as "customized bar code-based button effectuation", the logic for discerning between the aforementioned customized bar codes as scanned, and thereafter, executing the respective steps to carry out the desired approach to operational button usage by the user, are accomplished through the use of special purpose logic that resides in (special purpose) CPU 239. When provided in this manner, the operational button, as part of a special purpose machine, transforms a physical push on the given selection by a user into a useful result relating to either a connection based upon a standard USB port usage; or as a proprietary external scan usage, and thereafter, an industrial application as described herein. Ensuing usage of the same means that results such as native scans or external scans yield respective bar code sequences from reflected laser light upon visually printed or displayed indicia as desired through a selected unit. Alternatively, the user can, by utilizing the same CPU and cooperative elements associated therewith as described, utilize KTSync® type software downloaded therein, in order to provide the configuration options that enable a user to chose which button (native or external) configuration he desires. Either way, the output from this process causes barcode scanner 110 to output, store and as needed, transmit a barcode sequence output that is then correlated to effectuation of industrial physicalities, namely practical applications such as product stock levels when used in logistics and warehousing applications, medical records and therapeutic administrations when used in medical applications, product inquiries and subsequently with usage of payment terminal 120, purchases when used in the retail field of applications, running an assembly line in manufacturing applications, access controls for items and/or individuals when used in security applications, etc. At its highest level then, it may be said that for one embodiment, instructions (in one embodiment including configuration instructions) are received from the aforementioned special purpose CPU 239, wherein the further include the step of causing an output, received from a barcode scanner 110 via said USB port, of a barcode sequence output, said output then effectuating at least one industrial application, such as one of the above as listed, or potentially others. As can be appreciated, such industrial applications are legion and the above is not meant to be limiting in any regards.

Considering the above, one particular point of novelty in the present invention therefore pertains to the ability to configure the sled 100 and attached peripherals (barcode scanner 110, payment terminal 120, etc.) without the use of a display. For instance, electronic operability between all such devices requires configuration. Configuration of interconnected devices of any kind in general requires connecting to a PC or the like, and often necessitates the use of a screen and user input devices in order to configure the same, something which can be tiresome and inconvenient. In the novel amalgamation of devices described herein, this need for display-based configuration is no different, but the present invention provides, in one embodiment, for a novel display-free configuration through configuration instructions. As referenced above, this can be accomplished by configuring according to either usage of a native mobile device configuration utility or through the use of scanning of special barcodes. External scan button is provided on the sled in order enhance the scanning convenience because the native operation (scanning) button may not be readily accessible when attached to sled 100. The configuration of this External scan button is provided through the already-existing USB connection and ports, and in one embodiment, without the need for additional, specialized circuitry beyond that which is also disclosed herein, as the USB circuitry is used to transmit the External button configuration signals per FIG. 3, in addition to supporting normal USB communication signals. It is therefore quite novel that one USB port can support both external scan buttons, as well as USB communication. Accordingly, the USB/External button selection logic 310 is novel and a desired selection signal can be programmed by scanning a special barcode, and/or through novel internal/external programming supplied natively. Note that this logic, just like the special purpose CPU 239 and the special purpose MUX logic core, are, in one embodiment, all situated within barcode scanner 110. By contrast, in another embodiment, one could place the MUX logic core within sled 100, outside barcode scanner 110, in wireless communication therewith, however, such an approach may be less efficient that the former approach. Additionally, special Bluetooth® management software such as the KTSync® software, also available from KoamTac® Inc., of Princeton, N.J. may also be employed to effectuate provision of the above as further described herein.

Figure 4A:
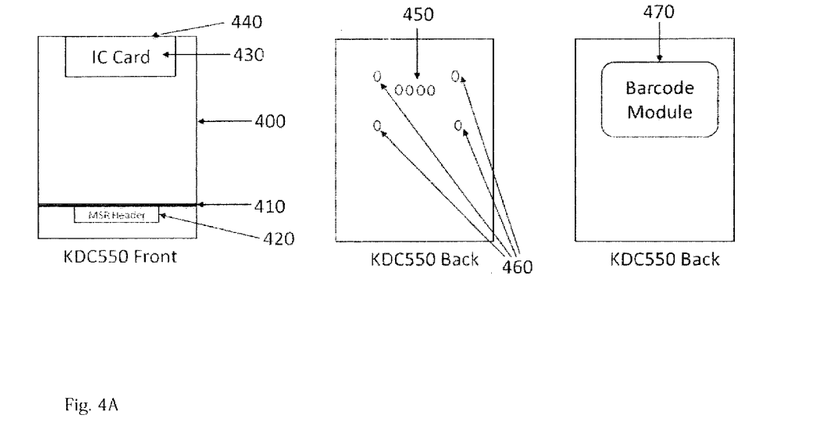
FIGS. 4A-B depict an illustrative payment terminal connected to a barcode reader and illustrative IC reader and MSR reader, according to one embodiment of the present invention, with FIG. 4A showing the barcode reader front and back, and FIG. 4B showing the payment terminal front and back.
Figure 4B:
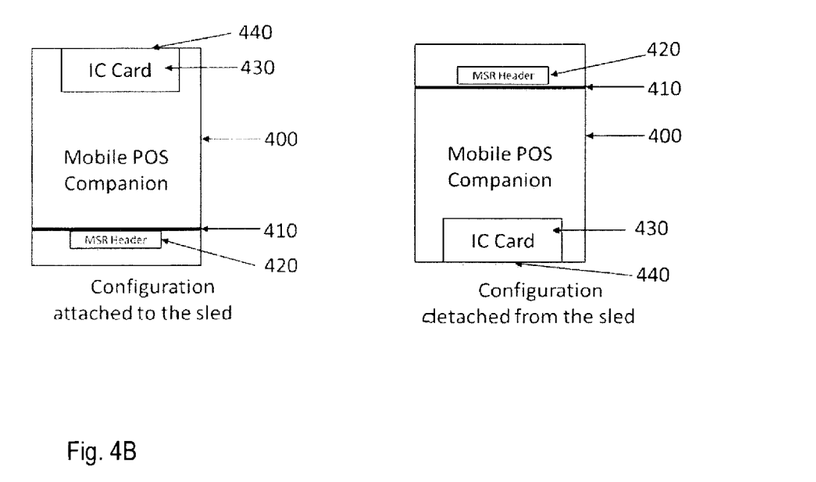

As seen in FIGS. 4A-4B, Payment terminal 120 has, in one embodiment, a Barcode, MSR, Chip and PIN and NFC features. MSR header 420 may be positioned at the bottom of Payment terminal 120 so that users can swipe the card while the payment module is attached inventive sled 100 and put on top of a table or other flat surface 130 in (foldable) standing configuration for ease of use. IC Card reader 430 would be positioned at the top of Payment terminal 120 so that users can insert their credit card through 440 while the payment module is attached to inventive sled 110 and put on the top of table in standing configuration 130. Payment terminal 120 would have Power 450, Ground, TxD and RxD signals and mounting holes 460 for Barcode Module 470. It is sometimes easier to read the magnetic strip from the top of Payment Terminal 120 and IC card from the bottom of Payment Terminal 120 if detached and used separately (perhaps with wireless communication option as described above), and as depicted herein, is offered in one embodiment as readily detachable, and thereafter, readily (re)attachable together with sled 100.

Accordingly, while the illustrative sled supports detachable payment terminal 120, but this beneficial feature is compromised by the structural fact that which payment terminal 120 is left with limited orientation due to the standing configuration 130 option. Therefore, a novel feature of the present invention overcomes this shortcoming by providing for payment terminal 120 to rotate the display by 180 degrees in order to maximize the usability between the different resulting viewability when attached to the sled and detached from the sled, as seen in FIG. 4 which shows the different configurations of novel payment terminal 120 across the 180 degree transition of the viewing screen. In one embodiment, payment terminal 120 may be chosen from the group comprising an illustrative KDC 550 unit, available from Koamtac, Inc. of Princeton N.J. In such a novel payment terminal 120 as found illustratively in the KDC 550 unit, it recognizes detachment from (tablet variant of) sled 100 by internal proximity sensor or payment terminal 120 connector for sled 100. Alternatively, payment terminal 120 can detect the connection via motion sensors, power connector, USB connector, magnetic sensors, proximity sensors. Once detachment is sensed, payment terminal 120, through its automatic logic built therein, it can reverse the display upon detection of the detachment from sled 100. Thus, payment terminal 120 would rotate the screen 180 degrees once detached from the sled 100 so that user can swipe the magnetic strip from the top and read IC card from the bottom. Similarly, payment terminal 120 with its optional display, returns to its original orientation upon connecting (placed back) to sled 100. When provisioned as such, payment terminal 120 is configurable through at least one of the following of: via a USB connector when attached to sled 100; via a native configuration when not attached to sled 100; or via a simple power connection, such as a pogo pins or the like.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims.

I claim:

1. A mobile device and peripheral device consolidation system for improved physical and electronic interoperability between a mobile device and at least one peripheral device, said mobile device and peripheral device consolidation system comprising:
   (a) a modular sled having:
   an attachment means for physically attaching a structure of said sled to said mobile device;
   at least one USB port;

an external button selection multiplexer (MUX) logic core;
at least one external button electronically connected to said External Button selection MUX logic core;
wherein said External Button selection MUX logic core includes special purpose logic circuitry for configuring said at least one USB port as either:
a standard USB port; or
as a proprietary external scan button logic pathway; and
(b) at least one attachment means for physically attaching said at least one peripheral device to said structure of said sled.

2. The mobile device and peripheral device consolidation system for improved physical and electronic interoperability between a mobile device and at least one peripheral device of claim 1, wherein said modular sled includes at least one of the following of said at least one peripheral device chosen from the group consisting of compact bar code readers, Magnetic Strip Readers (MSRs), Integrated Circuit (IC) card readers, peripheral device triggers, Radio Frequency Identification (RFID) tag readers, biometric verification modules, or multi-threat monitors; and payment terminals.

3. The mobile device and peripheral device consolidation system for improved physical and electronic interoperability between a mobile device and at least one peripheral device of claim 2, wherein said modular sled includes special purpose logic for receiving External Button selection instructions through a port connecting said modular sled and said at least one peripheral device.

4. The mobile device and peripheral device consolidation system for improved physical and electronic interoperability between a mobile device and at least one peripheral device of claim 3, wherein said External Button selection instructions are received from at least one CPU of said at least one peripheral device.

5. The mobile device and peripheral device consolidation system for improved physical and electronic interoperability between a mobile device and at least one peripheral device of claim 4, wherein said at least one attachment means for physically attaching said at least one peripheral device to said structure of said sled includes a readily attachable and detachable structure chosen from the group consisting of at least one of the following of: a pocket; a slot, a locking mechanism, a male/female type USB arrangement, or a sliding engagement arrangement.

6. The mobile device and peripheral device consolidation system for improved physical and electronic interoperability between a mobile device and at least one peripheral device of claim 5, further including at least one foldable standing configuration member.

7. The mobile device and peripheral device consolidation system for improved physical and electronic interoperability between a mobile device and at least one peripheral device of claim 6, wherein said at least one peripheral device further includes at least one of the following of:
an improved swing out USB male connector or a fixed position USB memory stick connector.

8. The mobile device and peripheral device consolidation system for improved physical and electronic interoperability between a mobile device and at least one peripheral device of claim 7, wherein said of said at least one peripheral device is a payment terminal, wherein said payment terminal includes a payment terminal screen having a 180° rotation.

9. The mobile device and peripheral device consolidation system for improved physical and electronic interoperability between a mobile device and at least one peripheral device of claim 7, wherein said payment terminal is configurable through at least one of the following of:
via a USB connector when attached to said sled;
via a native configuration when not attached to said sled; or
via a power connection.

10. A method for consolidating a mobile device with a peripheral device comprising at least the following steps:
(a) configuring a special purpose CPU with custom logic for assessing button configuration selections;
(b) configuring a special purpose multiplexer with custom logic for executing button configuration selections;
(b) loading said special purpose CPU with instructions for executing button configuration selections;
(c) transmitting said instructions for executing button configuration selections to said special purpose multiplexer;
(d) carrying out said instructions for executing button configuration selections at said special purpose multiplexer; and
(e) utilizing said instructions for executing button configuration selections to operate a USB port as a communications port when said instructions indicate an External Button selection or as a regular USB port when said instructions indicate a Native Button selection.

11. The method of claim 10, wherein said instructions are received from said special purpose CPU of said at least one peripheral device.

12. The method of claim 11, wherein said instructions received from said special purpose CPU further include the step of causing an output, received from a barcode scanner via said USB port, of a barcode sequence output, said output then effectuating at least one industrial application.

13. The method of claim 12, wherein said loading of said special purpose CPU with instructions for executing button configuration selections is derived from a downloadable software program or from said peripheral device scanning a customized barcode.

* * * * *